United States Patent
Kruse et al.

(10) Patent No.: US 12,285,906 B2
(45) Date of Patent: Apr. 29, 2025

(54) SYSTEMS AND METHODS FOR CONTROLLING THERMAL CONDUCTION IN X-RAY TUBE CATHODES

(71) Applicant: GE Precision Healthcare LLC, Wauwatosa, WI (US)

(72) Inventors: Kevin Kruse, Muskego, WI (US); Thomas Murray, Milwaukee, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 226 days.

(21) Appl. No.: 17/839,753

(22) Filed: Jun. 14, 2022

(65) Prior Publication Data

US 2022/0310350 A1 Sep. 29, 2022

Related U.S. Application Data

(62) Division of application No. 16/775,145, filed on Jan. 28, 2020, now Pat. No. 11,380,509.

(51) Int. Cl.
*H01J 35/06* (2006.01)
*B29C 64/10* (2017.01)
*B33Y 80/00* (2015.01)

(52) U.S. Cl.
CPC .............. *B29C 64/10* (2017.08); *B33Y 80/00* (2014.12); *H01J 35/064* (2019.05); *H01J 35/066* (2019.05); *H01J 2235/1212* (2013.01)

(58) Field of Classification Search
CPC .......... B29C 64/10; B33Y 80/00; H01J 35/06; H01J 35/064; H01J 2235/16; H01J 2235/167; H01J 2235/1212
See application file for complete search history.

(56) References Cited

U.S. PATENT DOCUMENTS

2021/0350995 A1* 11/2021 Dietrich .................. H01J 25/42

* cited by examiner

*Primary Examiner* — Monica A Huson

(57) ABSTRACT

Systems and methods are provided for improving thermal management strategies of a cathode assembly of an X-ray tube. In one embodiment, an X-ray tube comprises an anode assembly and a cathode assembly, wherein the cathode assembly includes one or more elements that include an internal porous section for controlling a flow of heat within the cathode assembly during operation of the X-ray tube. In this way, heat conduction to temperature sensitive aspects of the cathode assembly may be reduced, while enabling sufficient heat transfer to other parts of the cathode assembly to minimize deformation.

4 Claims, 9 Drawing Sheets

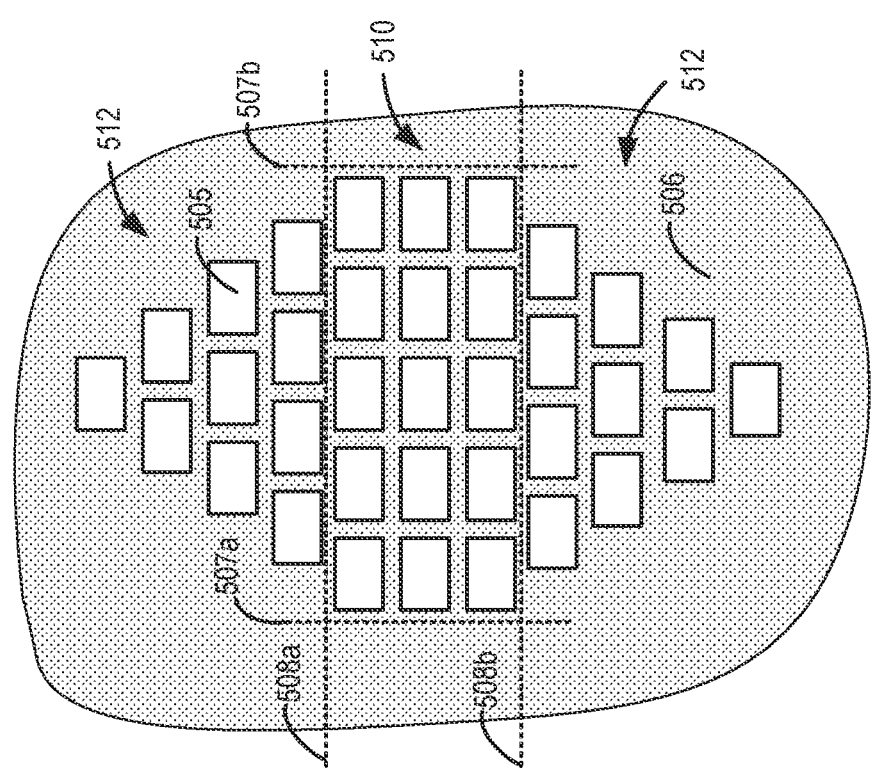

SYSTEMS AND METHODS FOR CONTROLLING THERMAL CONDUCTION IN X-RAY TUBE CATHODES

CROSS-REFERENCE TO RELATED APPLICATIONS

The present application is a divisional application of and claims priority to U.S. patent application Ser. No. 16/775,145, filed on Jan. 28, 2020, the entirety of which is incorporated herein by reference.

BACKGROUND

Embodiments of the subject matter disclosed herein relate to controlling heat transfer in an X-ray tube cathode assembly via inclusion of porous internal sections.

In an X-ray tube, ionizing X-rays are created by accelerating electrons in a vacuum insert from a cathode to an anode via an electric field. Typically, an emitter is heated by a current flowing through it, to create a plurality of electrons which may be formed as an electron beam that is accelerated towards the anode. In addition, a plurality of electrodes at different voltages may be used to focus the electron beam towards the anode, and to influence the size and position of the X-ray focal spot.

BRIEF DESCRIPTION

In one aspect, an X-ray tube comprises an anode assembly and a cathode assembly, wherein the cathode assembly includes one or more elements that include an internal porous section for controlling a flow of heat within the cathode assembly during operation of the X-ray tube. In this way heat conduction to temperature-sensitive aspects of the cathode assembly may be reduced, while enabling sufficient heat transfer to other parts of the cathode assembly to minimize deformation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIG. 5 illustrates an example manner in which the internal porous sections of the present disclosure may transition to solid internal sections;

DETAILED DESCRIPTION

Figure 1A:
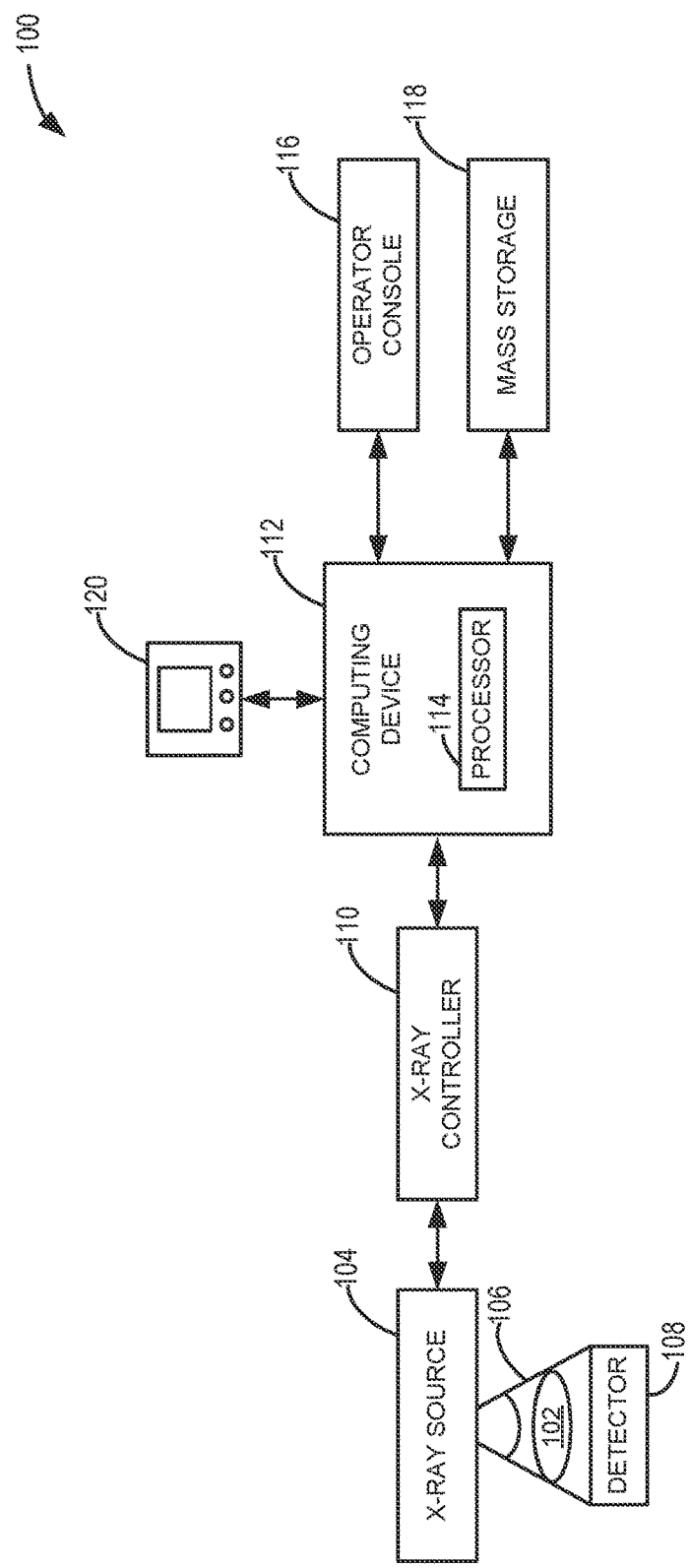
FIG. 1A illustrates a block schematic diagram of an exemplary X-ray imaging system according to an embodiment.
Figure 1B:
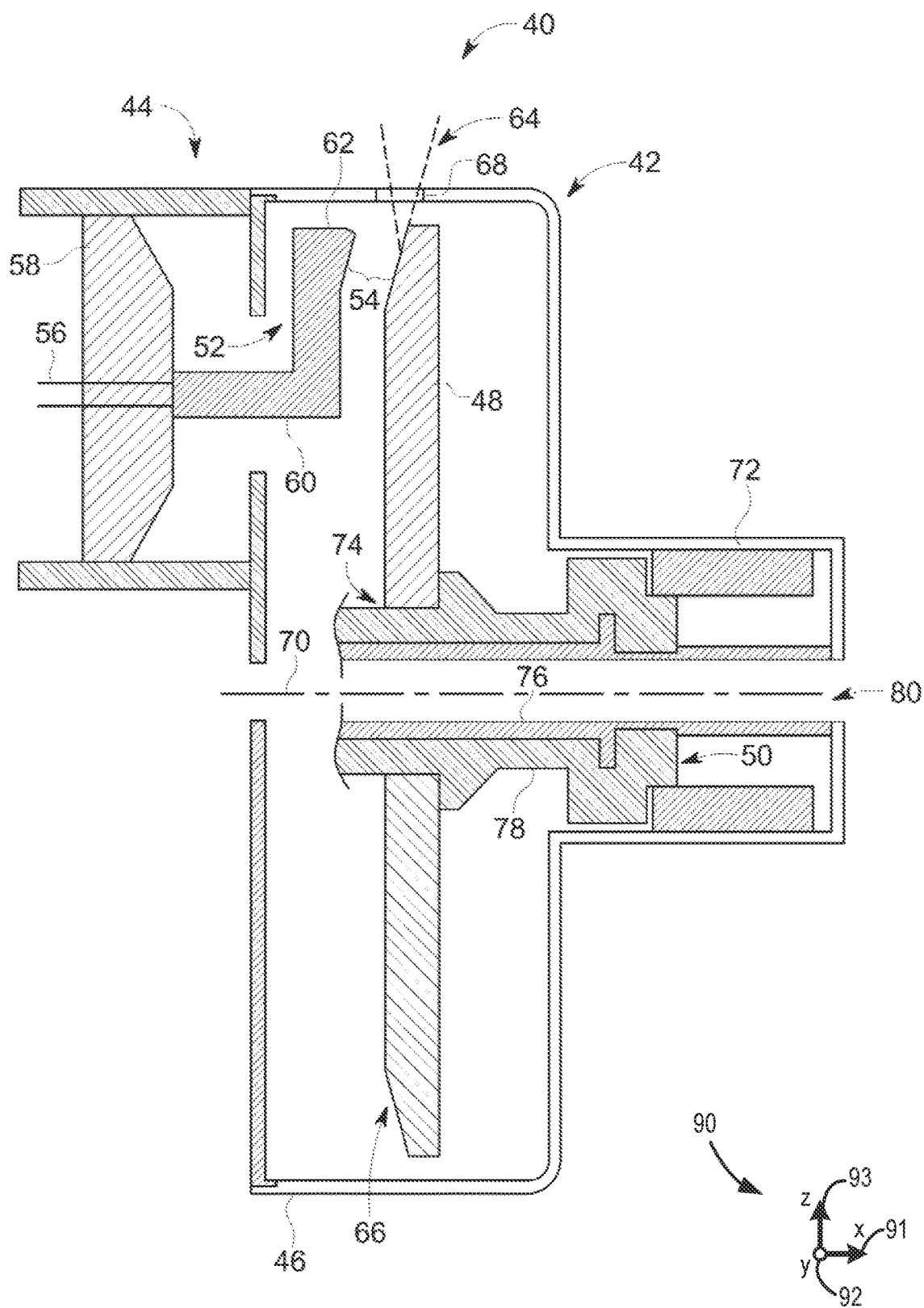
FIG. 1B illustrates a pictorial view of an X-ray tube, according to an embodiment.
Figure 2A:
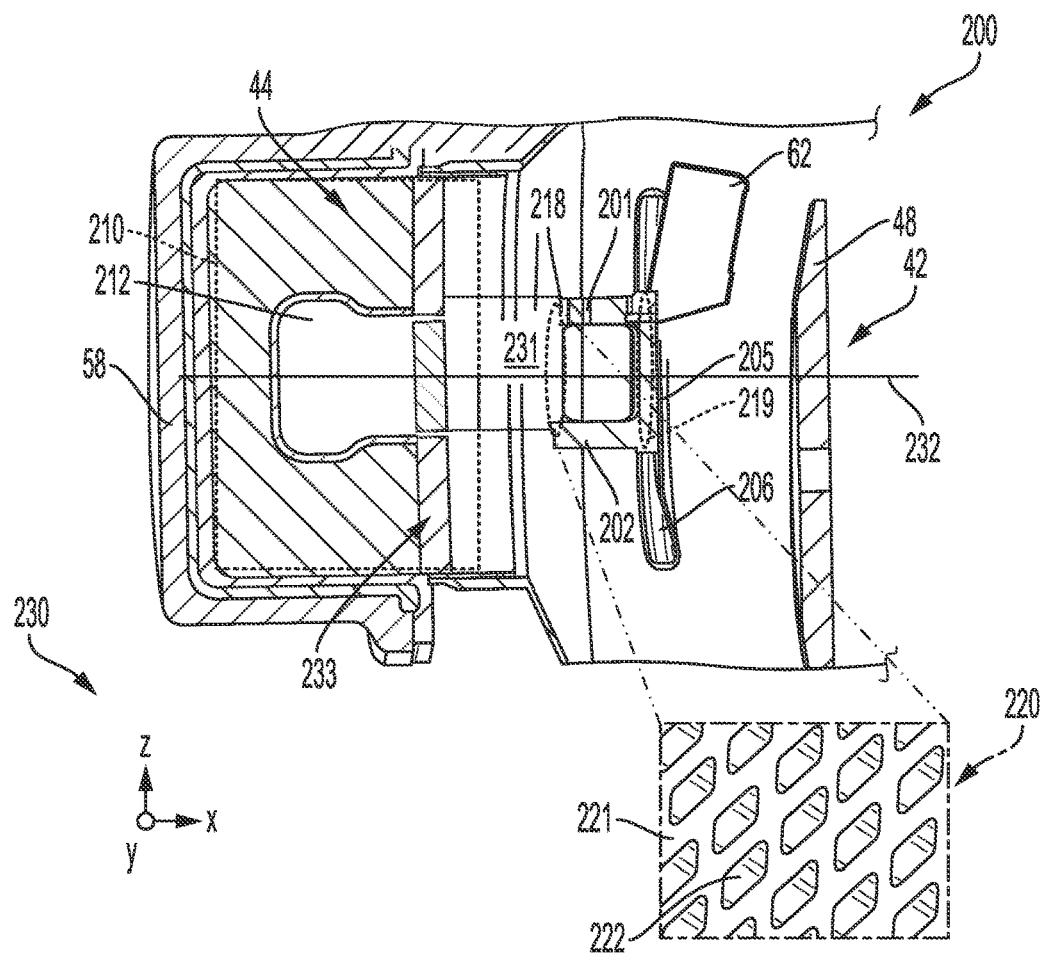
FIG. 2A illustrates an example cross-section of a cathode assembly and an anode assembly of the X-ray tube of FIG. 1B, including example porous internal sections in a lower extender that couple a cathode cup assembly to a high voltage connector.

The following description relates to various embodiments of an X-ray imaging system, such as the X-ray imaging system of FIG. 1A, which includes an X-ray source, such as an X-ray tube. Specifically, the various embodiments relate to thermal management of a cathode assembly of an X-ray tube. The cathode assembly may include an emitter and the anode assembly may include a target for the production of X-rays, as depicted at FIG. 1B. The cathode assembly may include a cathode cup assembly, and a high voltage connector, where the cathode cup assembly is mechanically coupled to the high voltage connector via a lower extender, as depicted by FIG. 2A. The lower extender may include one or more internal porous sections for controlling heat flow within the cathode assembly, as part of a thermal management strategy.

Figure 2B:
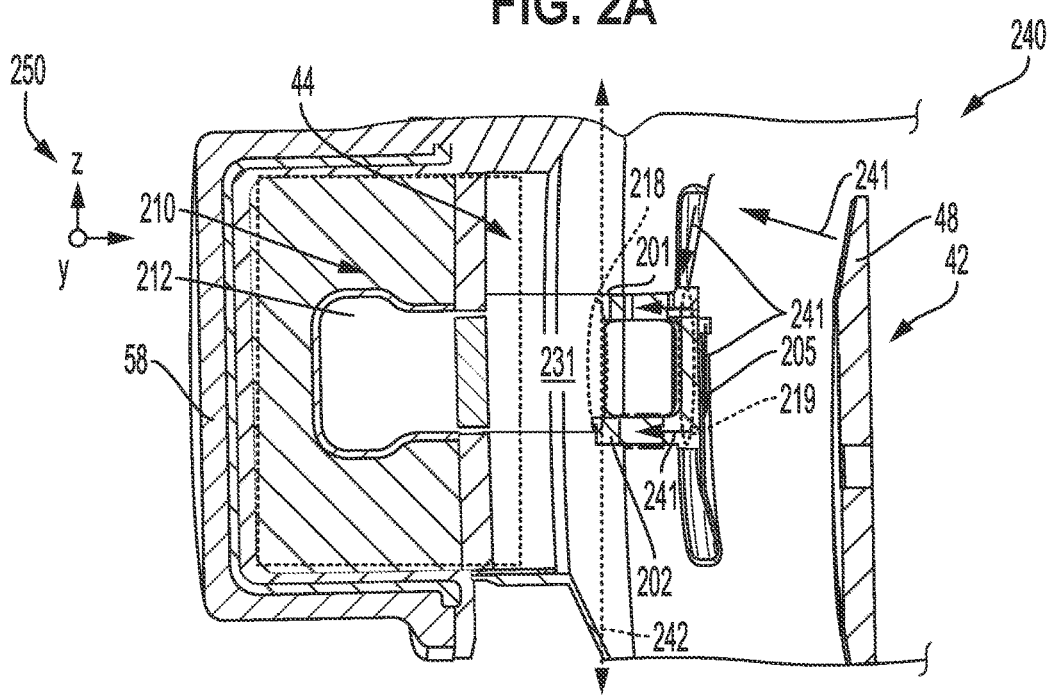
FIG. 2B illustrates the example cross-section of FIG. 2A including an illustration of a flow of heat due to inclusion of internal porous section(s) in the lower extender during operation of the X-ray tube.
Figure 2C:
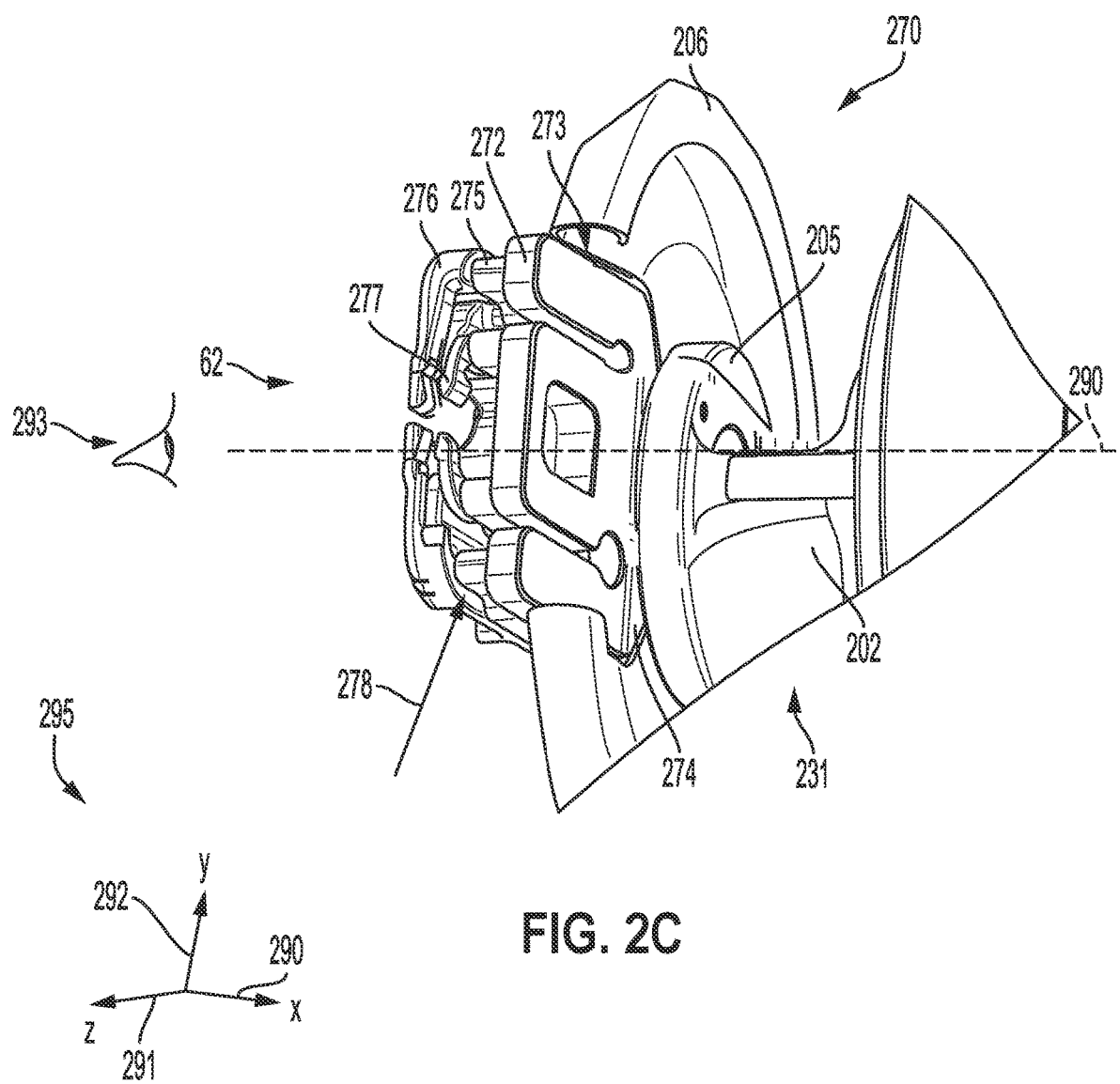
FIG. 2C illustrates a partial three-dimensional (3D) view of a portion of the cathode assembly of FIG. 1B.
Figure 2D:
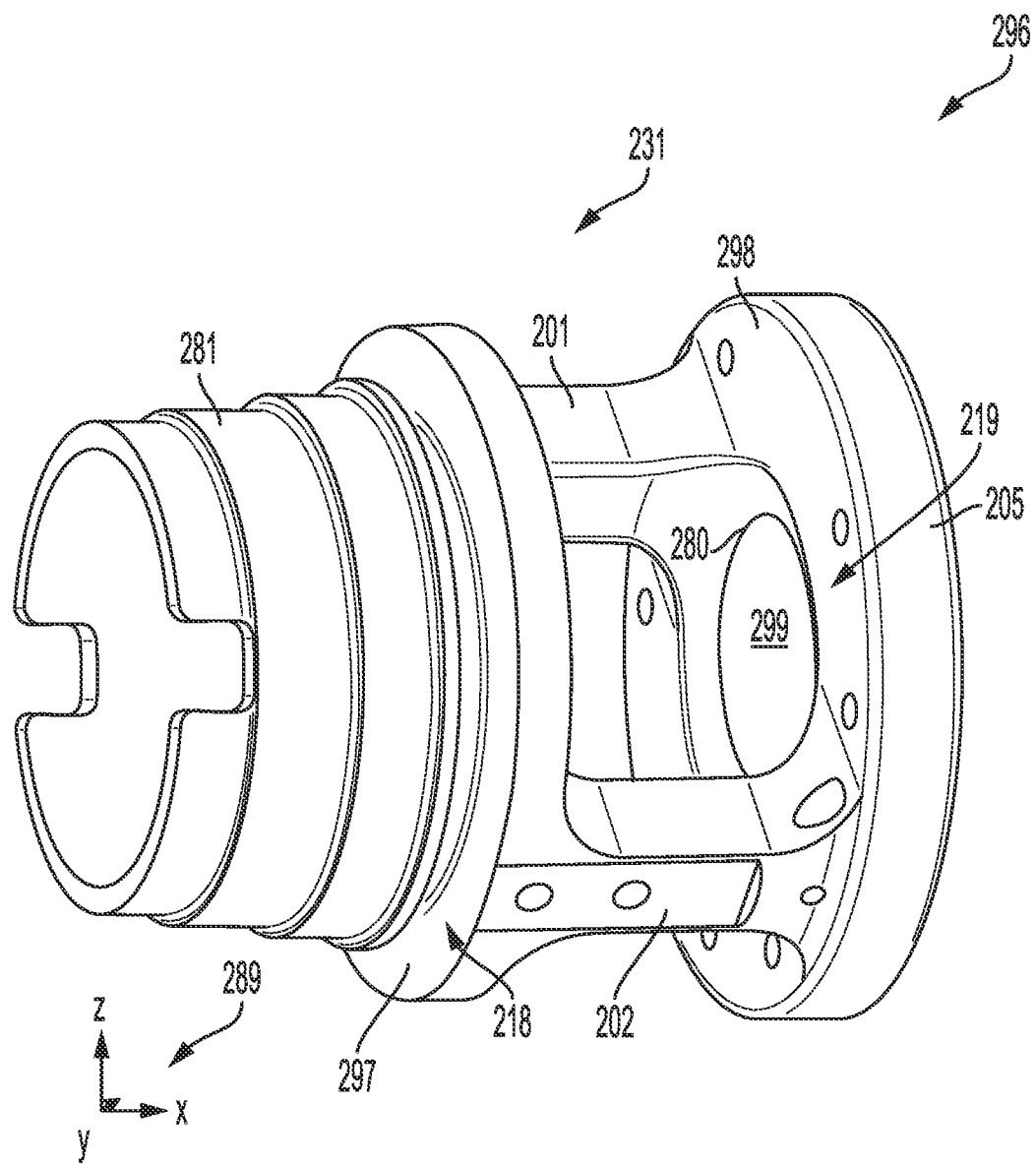
FIG. 2D illustrates a three-dimensional (3D) view of the lower extender depicted in FIG. 2A.

Accordingly, FIG. 2B depicts an example flow of heat within a cathode assembly under conditions where the lower extender includes internal porous sections. For illustrative purposes, FIGS. 2A-2B are represented as cross-sections of the cathode and anode assemblies of FIG. 1B. A three-dimensional (3D) view of a portion of the cathode assembly, including the cathode cup assembly of FIGS. 2A-2B is depicted at FIG. 2C. A three-dimensional (3D) view of the lower extender of FIGS. 2A-2C is depicted at FIG. 2D.

Figure 3A:
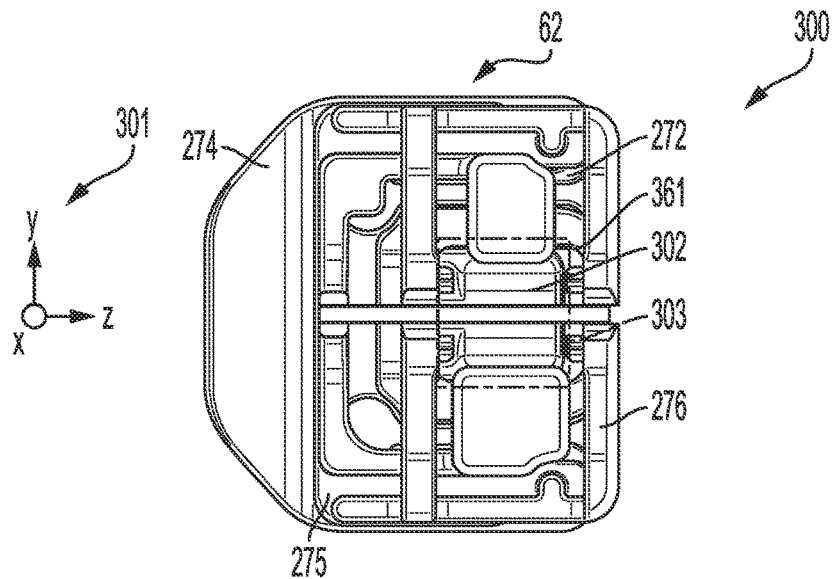
FIG. 3A illustrates a three-dimensional (3D) view of a portion of a cathode cup assembly of the cathode assembly of FIG. 2C.

As mentioned, the lower extender may be one example element of the cathode assembly that may include internal porous sections for the purposes of thermal management. Additionally or alternatively, one or more elements of the cathode cup assembly may include internal porous sections for improving thermal management of the cathode assembly. FIG. 3A shows an example three-dimensional (3D) view of the cathode cup assembly of FIG. 1B and FIGS. 2A-2C. The cathode cup assembly may include a cup plate, from which extends a cup section. In some examples, at least a portion of the cup section may include internal porous sections, for thermal management of heat stemming from the emitter of the cathode cup assembly and/or target, as discussed with regard to FIG. 3B. The emitter may be mounted (e.g., welded) within the cathode cup assembly via an emitter weld pad, such as the emitter weld pad of FIG. 3C. The emitter weld pad may additionally or alternatively include internal porous sections, for example in one or more legs or leg elements of the emitter weld pad, for thermal management of heat stemming from at least the emitter of the cathode cup assembly.

The internal porous sections of one or more elements of the cathode assembly of the present disclosure may be of predetermined shapes and dimensions, as depicted illustratively via FIGS. 4A-4D. The shapes and/or dimensions of internal porous sections may be selected based on a desired heat flow within the cathode assemblies of the present disclosure. Operationally, the generation of X-rays via the X-ray tube of FIG. 1B may take place in a reduced pressure (e.g., vacuum, or negative pressure with respect to atmospheric pressure) environment. Accordingly, it may be desirable to additionally include a means for evacuating an entirety of the internal porous sections. An illustration of how the internal porous sections may be evacuated is depicted at FIG. 4E.

With respect to the incorporation of internal porous sections into one or more elements of the cathode assemblies of the present disclosure, the design thereof may include accounting for not just thermal properties, but also issues related to structural integrity and fatigue (e.g., stress) management. Thus, there may be options for transitioning from internal porous sections to solid sections, as depicted illustratively at FIG. 5.

Figure 6:
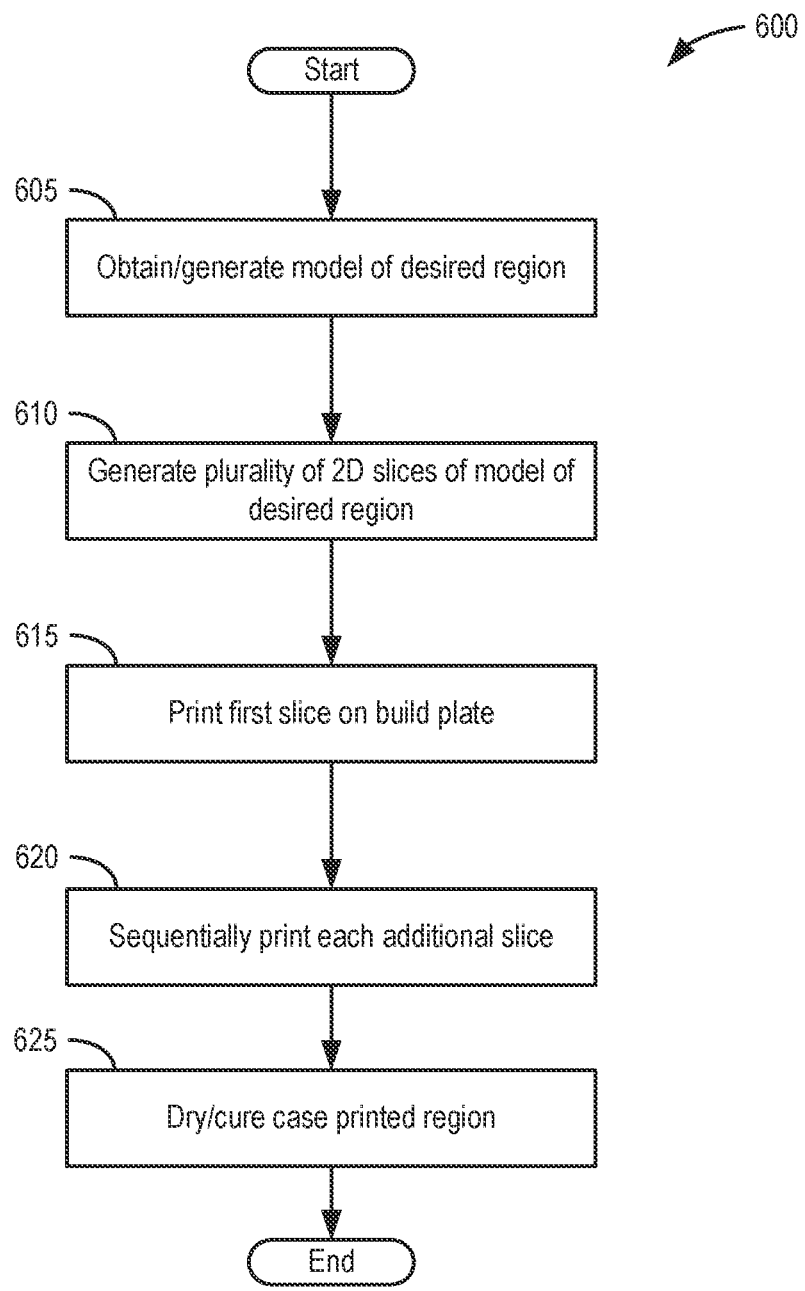
FIG. 6 illustrates a flowchart illustrating an example method for manufacturing a cathode cup assembly or other components of a cathode assembly of an X-ray tube of the present disclosure.

The internal porous sections may be included in the cathode assembly of the present disclosure via the use of additive manufacturing technology, such as three-dimensional (3D) printing. The use of additive manufacturing technology may instead enable the combining of the different components/materials into a monolithic cathode cup assembly, which may include internal porous sections for improving thermal management thereof. Additive manufacturing technology may additionally or alternatively be used to incorporate internal porous sections into portions of the lower extender that couple the cathode cup assembly to the high voltage connector. An example methodology for relying on additive manufacturing technology to produce one or more components of the cathode assembly of the present disclosure, is depicted at FIG. 6.

Thus, according to embodiments discussed herein, one or more internal porous sections may be incorporated into one or more elements or components of a cathode assembly of an X-ray tube. In some embodiments, the one or more internal porous sections may be incorporated in a lower extender that mechanically couples a cathode cup assembly to a high voltage connector. Additionally or alternatively, the one or more internal porous sections may be incorporated into one or more legs or leg elements of an emitter weld pad that is used to secure an emitter to the cathode cup assembly. Additionally or alternatively, the one or more internal porous sections may be incorporated into a cup section that sits adjacent the emitter, or other aspects of a cup plate that includes the cup section. Dimensions, shape, density, etc., of the internal porous sections may be selected and included in the cathode cup assembly of the present disclosure based on parameters including but not limited to thermal management strategy, fatigue aspects, and structural integrity considerations.

The embodiments disclosed herein may provide several advantages. For example, X-ray tube lifetime may be increased via the strategic incorporation of internal porous sections into elements of the cathode assembly of the present disclosure, as thermal management strategy of the cathode assembly may be thereby improved. More specifically, thermal management of insulators associated with the cathode assembly of the present disclosure may be improved in a manner that lowers temperatures of the insulators, thereby increasing efficacy of the insulators and in turn extending the lifetime of the X-ray tube. Further, the use of additive manufacturing technology to include internal porous sections in the cathode assembly of the present disclosure may enable a lowering of costs and/or a simplification of structural aspects of the cathode assembly of the present disclosure, by enabling the combining of multiple pieces or components into fewer components. Still further, an advantage of including the porous sections internally is that it may enable externals of the cathode assembly to be uniform, and where desired, electropolished, which may improve high voltage capability compared to other components which may have to be machined down to reduce thermal conductance (which may introduce field intensity concentrations at the external radii and chamfers, for example).

The drawing figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1A illustrates an X-ray imaging system 100 designed to generate X-rays. The X-ray imaging system 100 may be configured as a computed tomography (CT) imaging system, X-ray radiography system, X-ray interventional system, X-ray fluoroscopy system, X-ray tomography system, or X-ray mammography system, etc. However, the X-ray imaging system 100 has applicability to fields beyond imaging, medical devices, and the like. For instance, the X-ray imaging system 100 may be deployed in crystallography systems, security scanners, industrial scanners, X-ray photography systems, etc. It will also be appreciated that the liquid metal bearing assemblies described in greater detail herein may be deployed in alternate types of systems utilizing liquid metal bearings, in some instances.

In the X-ray imaging system example, the X-ray imaging system may be configured to image a subject 102 such as a patient, an inanimate object, one or more manufactured parts, industrial components, and/or foreign objects such as implants stents, and/or contrast agents present within the body.

The X-ray imaging system 100 may include at least one X-ray source or X-ray tube, such as an X-ray source 104 configured to generate and project a beam of X-rays 106 towards subject 102 and X-ray detector 108. Specifically, in the illustrated embodiment, the X-ray source 104 is configured to project the X-ray beam 106 towards an X-ray detector 108 and through the subject 102. In some system configurations, the X-ray source 104 may project a cone-shaped X-ray beam which is collimated to lie within an X-Y-Z plane of a Cartesian coordinate system. However, other X-ray beam profiles and/or systems omitting the X-ray detector have been envisioned. Each X-ray detector element produces a separate electrical signal that is a measurement of the X-ray beam attenuation at the X-ray detector element location.

Although FIG. 1A depicts only a single X-ray source 104 and X-ray detector 108, in certain embodiments, multiple X-ray sources and/or X-ray detectors may be employed to project a plurality of X-ray beams and detect the X-rays. For instance, in a computed tomography (CT) imaging system use-case example, multiple X-ray detector elements may be used in tandem with the X-ray source to acquire projection data at different energy levels corresponding to the subject.

The X-ray imaging system 100 may further include an X-ray controller 110 configured to provide power and timing signals to the X-ray source 104. It will be understood that that X-ray imaging system may also include a data acquisition system configured to sample analog data received from the X-ray detector elements and convert the analog data to digital signals for subsequent processing.

In certain embodiments, the X-ray imaging system 100 may further include a computing device 112 having a processor 114 and controlling system operations based on operator input. The computing device 112 receives operator input, for example, including commands and/or scanning parameters via an operator console 116 operatively coupled to the computing device 112. The operator console 116 may include a keyboard, a touchscreen, and/or other suitable input device allowing the operator to specify the commands and/or scanning parameters.

Although FIG. 1A illustrates only one operator console 116, more than one operator console may be included in the X-ray imaging system 100, for example, for inputting or outputting system parameters, requesting examinations, plotting data, and/or viewing images. Further, in certain embodiments, the X-ray imaging system 100 may be coupled to multiple displays, printers, workstations, and/or similar devices located either locally or remotely, for example, and connected via wired and/or wireless networks.

In one example, the computing device 112 stores data in a storage device or mass storage 118. The mass storage 118, for example, may include a hard disk drive, a floppy disk drive, a compact disk-read/write (CD-R/W) drive, a Digital Versatile Disc (DVD) drive, a flash drive, and/or a solid state storage system.

Additionally, the computing device 112 provides commands to the X-ray controller 110 and other system components for controlling system operations such as X-ray beam formation, data acquisition and/or processing, etc.

Thus, in certain embodiments, the computing device 112 controls system operations based on operator input. To elaborate, the computing device 112 may use the operator-supplied and/or system-defined commands and parameters to operate an X-ray controller 110, which in turn, may control the X-ray source 104. In this way, the intensity and timing of X-ray beam generation may be controlled. It will also be understood that the rotational speed of the target in the X-ray tube may be adjusted by the computing device 112 in conjunction with the X-ray controller 110. The rotational speed adjustment of the target may induce the flow of liquid metal into a bearing interface in the X-ray source 104, as described in greater detail herein.

In one embodiment, a display 120 may also be in electronic communication with the computing device 112 and is configured to display graphical interfaces indicating system parameters, control settings, imaging data, etc.

FIG. 1B illustrates a cross-sectional view of an X-ray source or X-ray tube 40 incorporating embodiments of the invention. In the illustrated embodiment, X-ray tube 40 includes an anode assembly 42 and a cathode assembly 44. X-ray tube 40 is supported by the anode and cathode assemblies 42, 44 within an enclosure or insert 46, which houses a target 48, a bearing assembly 50, and a cathode 52. Enclosure 46 defines an area of relatively low pressure (e.g., a vacuum) compared to ambient, in which high voltages may be present. Enclosure 46 may be positioned within a casing (not shown) filled with a cooling medium, such as oil, that may also provide high voltage insulation. While the target and anode are described above as being a common component of X-ray tube 40, the target and anode may be separate components in alternative X-ray tube embodiments.

In operation, an electron beam 54 is produced by cathode assembly 44. In particular, cathode 52 receives one or more electrical signals via a series of electrical leads 56 (e.g., high voltage connector). The electrical signals may be timing/control signals that cause cathode 52 (i.e., emitter) to emit an electron beam 54 at one or more energies and at one or more frequencies. The electrical signals may also at least partially control the potential between cathode 52 and anode 48. Cathode 52 includes a central insulating shell or insulator 58 from which an emitter assembly 60 extends. Emitter assembly 60 is coupled to electrical leads 56, which extends to a cathode cup assembly 62, housing an emitter, mounted at the end of the emitter assembly 60. In some embodiments, cathode cup assembly 62 includes a focusing cup that serves as an electrostatic lens that focuses electrons emitted from the emitter within the cathode cup assembly 62 to form an electron beam 54. Electrical leads 56 supply power from a power supply, including a high voltage source. Electron beam 54 is produced by the emitter within the cathode cup assembly 62 of the cathode assembly 44. X-rays 64 result when high-speed electrons of the electron beam 54 are suddenly decelerated by hitting the target 48. The X-rays 64 may be detected via an X-ray detector (not shown) as discussed above.

X-rays 64 are produced when high-speed electrons of the electron beam 54 are suddenly decelerated when directed from the emitter in the cathode 52 to a focal surface 66 formed on target 48 via a potential difference (i.e., a voltage difference) between the cathode and anode, for example, thousands of volts or more. The X-rays 64 are emitted through a radiation emission passage (i.e., a beryllium window) 68 formed in enclosure 46 toward an X-ray detector (not shown).

Anode assembly 42 includes a rotor 72 and a stator (not shown) located outside enclosure 46 and partially surrounding rotor 72 for causing rotation of target 48 during operation. Target 48 is supported in rotation by a bearing assembly 50, which, when rotated, also causes target 48 to rotate about centerline 70. As shown, target 48 has a generally annular shape, such as a disk, and an annular opening 74 in the center thereof for receiving the bearing assembly 50.

Target 48 may be manufactured to include a number of metals or composites, such as tungsten, molybdenum, copper, or any material that contributes to Bermsstrahlung (i.e., deceleration radiation) when bombarded with electrons. Focal spot surface 66 of target 48 may be selected from a material having a relatively high refractory value so as to withstand the heat generated by electrons impacting target 48. Further, the space between cathode cup assembly 62 and target 48 may be evacuated in order to minimize electron collisions with other atoms and to maximize the electric potential.

To avoid overheating of the target 48 when bombarded by the electrons, rotor 72 rotates target 48 at a very high rate of speed (e.g., 90 to 250 Hz) about centerline 70. In addition to the rotation of target 48 within X-ray tube enclosure 46, in a computed tomography (CT) application, the X-ray tube 40 as a whole is caused to rotate within a gantry (not shown) about a subject (e.g., a patient), at very high rates of speed.

Bearing assembly 50 comprises a liquid lubricated or self-acting bearing having adequate load-bearing capability and acceptable acoustic noise levels for operation within an imaging system (not shown). As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as sleeve 78 to which the target 48 is attached. While center shaft 76 is described with respect to FIG. 1B as the stationary portion of bearing assembly 50 and sleeve 78 is described as the rotating portion of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Center shaft 76 may optionally include a cavity or coolant flow path 80 though which a coolant, such as oil, may flow to cool bearing assembly 50. As such, a coolant enables heat generated from target 48 of X-ray tube 40 to be extracted therefrom and transferred external to X-ray tube 40.

For reference, a coordinate system 90 is depicted for the purposes of discussion of the remaining figures. Specifically, the coordinate system 90 includes an x-axis 91, a y-axis 92, and a z-axis 93.

It may be understood that each of the high voltage connector, cathode assembly and anode assembly include thermally sensitive parts. Thus, it is herein recognized that improvements to thermal management of the high voltage connector and/or the cathode assembly may increase lifetime of X-ray tubes of the present disclosure. For example, improved thermal management may reduce degradation associated with one or more parts of the cathode assembly and the high voltage connector, thereby improving operation, and increasing the lifetime of the X-ray tube. Current strategy for thermal management includes use of insulator material (e.g., ceramic material, epoxies, etc.), air-cooling (e.g., convection to air) and/or oil-based cooling (e.g., convection through oil surrounding the X-ray tube).

Thus, it is herein recognized that thermal management of the cathode and/or the high voltage connector may be improved by strategic incorporation of porous sections internal to particular parts or components of the X-ray tube that together make up the cathode and high voltage connector. For example, ceramics used for electrical insulation in cathodes, and epoxies used for electrical insulation in high voltage connectors may not be as effective insulators at higher temperatures. Thus, strategic incorporation of porous sections internal to various parts/components of the X-ray tube may limit heat conduction to temperature sensitive insulators, while still providing sufficient heat transfer for other parts of the cathode to minimize deformation. As will be elaborated in greater detail below, generation of such parts via additive manufacturing technology may enable the incorporation of the porous sections. As an additional advantage, the use of additive manufacturing technology may enable a reduction in complexity of manufacture and assembly of particular parts of the X-ray tube, which may in turn provide commercial advantages by lowering costs and streamlining assembly.

Turning to FIG. 2A, depicted is an example illustration 200 of a cross-section of a portion of the X-ray tube (e.g., X-ray tube 40) of FIG. 1B. A portion of FIG. 2A, indicated by dashed rectangle 210, is shown as a cutaway view. Coordinate system 230 depicts the same coordinate system 90 depicted at FIG. 1B, for reference. In this example illustration 200, the view is along the y-axis similar to the view of FIG. 1B. Central axis 232 is depicted, and it may be understood that the x-axis is parallel to central axis 232, while the y-axis and z-axis are each perpendicular to central axis 232. FIG. 2A includes cathode assembly 44, anode assembly 42, and cathode cup assembly 62. Lower extender 231 extends along the x-axis from high voltage connector region 212, and includes first extender region 201 and second extender region 202, each of which extend longitudinally along the x-axis. Lower extender 231 further includes first plate 205. It may be understood that each of first extender region 201, second extender region 202 and first plate 205 may be a single piece, referred to herein as lower extender 231. Central axis 232 is defined with respect to lower extender 231. First plate 205 of lower extender 231 may be mechanically coupled to heat shield 206. As will be elaborated in further detail below, heat shield 206 includes a notch or cutout for receiving cathode cup assembly 62, a portion of which is securely mechanically coupled to first plate 205 of lower extender 231. Cutout view 210 reveals high voltage connector region 212, also referred to herein simply as high voltage connector 212.

As discussed above, the high voltage connector 212 may include temperature sensitive parts. For example, gasket 233, all high voltage connector internals, and an internal gasket (not shown) may comprise temperature sensitive parts. To improve thermal management of high voltage connector 212, at least some portion of lower extender 231 may include internal porous regions, exemplified by inset 220. Briefly, inset 220 illustrates a close-up view of a first internal porous region 218 of lower extender 231 and/or a second internal porous region 219 of lower extender 231. Inset 220 depicts solid aspects 221 and internal passageways, or void aspects, 222. In some examples the internal passageways may be aligned along the x-axis (e.g., parallel to the central axis) such that, for example, air may travel from void to void along the x-axis. However, in other examples, the internal passageways may be aligned along the y-axis (e.g., perpendicular to the central axis), where air may travel from void to void along the y-axis. In still other examples, the internal passageways may be aligned along the z-axis (e.g., perpendicular to the central axis). The depiction of the internal porous region by inset 220 is meant to be illustrative, and it may be understood that dimensions (e.g., surface area, volume, shape, etc.) of the internal passageways may be determined based on the desired thermal management application, discussed in further detail below at FIGS. 4A-4E.

Turning now to FIG. 2D, example illustration 296 depicts an isolated view of lower extender 231, along similar axes (see coordinate system 289) as that depicted at FIG. 2A. As discussed, lower extender 231 includes first extender region 201 and second extender region 202. Further depicted is first plate 205, as discussed with regard to FIG. 2A, and second plate 297. First plate 205 is coupled to second plate 297 via first extender region 201 and second extender region 202, although as discussed above it may be understood that all of lower extender 231 may be a single piece. First plate 205 includes a first larger outer diameter circular section 298, and a smaller outer diameter circular section 299, defined by solid circle 280. It may be understood that the second internal porous region 219 as discussed with regard to FIG. 2A may comprise the larger diameter circular section 298 of first plate 205 of lower extender 231. In some examples the internal porous region may extend into at least a portion of, or an entirety of, first extender region 201 and/or second extender region 202, however in other examples the internal porous region of larger diameter circular section 298 may not extend into first extender region 201 or second extender region 202.

Second plate 297 may be of a larger outer diameter than adjacent coupling sections 281. Thus, it may be understood that second plate 297 may comprise first internal porous region 218 as discussed with regard to FIG. 2A. Adjacent coupling sections 281 may not include internal porous regions. In some examples, the internal porous region 218 may extend into at least a portion of, or an entirety of, first extender region 201 and/or second extender region 202. However, in other examples, the internal porous region of second plate 297 may not extend into first extender region 201 or second extender region 202.

It is herein recognized that inclusion of internal porous region(s) as discussed may be done via the use of additive manufacturing technology. The use of additive manufacturing technology may enable the inclusion of internal porous regions while additionally enabling external surfaces to be uniform and, if needed, electropolished. This may improve high voltage capability compared to, for example, similar parts that have to be machined down to reduce thermal conductance, which may result in field intensity concentrations at the external radii and chamfers.

Returning now to FIG. 2B, another depiction 240 of the cross-section of the portion of the X-ray tube depicted at FIG. 2A is shown, to illustrate a flow of heat in the X-ray tube, when porous internal sections are included in the lower extender 231, as discussed in detail above at FIG. 2A and FIG. 2D. Specifically, FIG. 2B shows a flow of heat when lower extender 231 includes first internal porous region 218 and second internal porous region 219.

Coordinate system 250 depicts the x, y, and z axes, showing that the view at FIG. 2B is the same as that depicted at FIG. 2A. Thus, it may be understood that at FIG. 2B, components that are the same as those of FIG. 2A are depicted by like numerals and are not reiterated for brevity.

Bold arrows 241 illustrate heat input (Qin) in the direction of the high voltage connector 212. Specifically, heat sources can include target 48, for example as electrons are decelerated via target 48 heat generated therefrom may be transferred to cathode cup assembly (e.g., cathode cup assembly 62 at FIG. 2A, not shown at FIG. 2B). Furthermore, the emitter included in cathode cup assembly 62 may also be a heat source due to current flow therethrough. As depicted at FIG. 2B by bold arrows 241, heat input may travel from target 48 and cathode cup assembly (not shown) to first plate 205 and then along first extender 201 and second extender 202. However, incorporation of the porous internal section into each of first internal porous region 218 and second internal porous region 219 directs the flow of heat out and away from high voltage connector 212 via forced oil convection, as illustrated by dashed arrows 242.

It may be understood that an amount by which the flow of heat is transferred out and away from high voltage connector 212 as opposed to being communicated to high voltage connector 212 may be dependent on how the particular porous sections are constructed. For example, a greater reduction in heat transfer may be achieved by a greater overall porous area relative to solid area as compared to a lesser overall porous area relative to solid area. The overall porous area may be increased via a greater number of smaller internal passageways (e.g., void aspects 222 at FIG. 2A), or by increasing individual area of the internal passageways, for example. In other words, thermal conduction may be relative to porous area, and thus it may be possible to specifically control an amount of heat transfer from heat sources such as the emitter and target to the high voltage connector. Additionally or alternatively, heat flow may be managed by selecting whether the internal porous regions are aligned with the x-axis, y-axis, or z-axis.

Turning now to FIG. 2C, depicted for reference is an example close-up three-dimensional (3D) view 270 of cathode cup assembly 62 coupled to first plate 205 of lower extender 231. For reference, coordinate system 295 depicts x-axis 290, y-axis 292, and z-axis 291. Observer 293 is shown viewing cathode cup assembly 62 along the longitudinal, or x-axis 290 in a direction of biasing electrodes 276 to cup plate 272.

As discussed above, first plate 205 is mechanically coupled to heat shield 206. Furthermore, cup plate 272, which is a component of cathode cup assembly 62, is received by notch 273 in heat shield 206. A first coupling region 274 of cup plate 272 mechanically couples to first plate 205 of lower extender 231.

Ceramic plate 275 is in face-sharing contact with cup plate 272 as illustrated. An opposite face of ceramic plate 275 shares at least some contact with biasing electrodes 276, depicted by arrow 278. A portion of emitter weld pad 277 is depicted as having face-sharing contact with ceramic plate 275. Each of the biasing electrodes 276, emitter weld pad 277, ceramic plate 275, and cup plate 272 are held together by connectors (not shown).

Cathode cup assembly 62 includes the emitter (not shown), which as discussed is a heat source. Furthermore, heat input to cathode cup assembly 62 occurs from heat generated at the target, as discussed. Ceramic plate 275 acts as an insulator, yet its insulating properties may be compromised when a threshold temperature is exceeded. In other words, ceramic plate 275 may no longer be an effective insulator responsive to the threshold temperature being exceeded. Accordingly, it is herein recognized that it may be desirable to include porous internal regions of one or more components that make up cathode cup assembly 62. Details of where it may be desirable to include porous internal regions in a component or components of cathode cup assembly 62 will be elaborated in greater detail below.

Figure 3B:
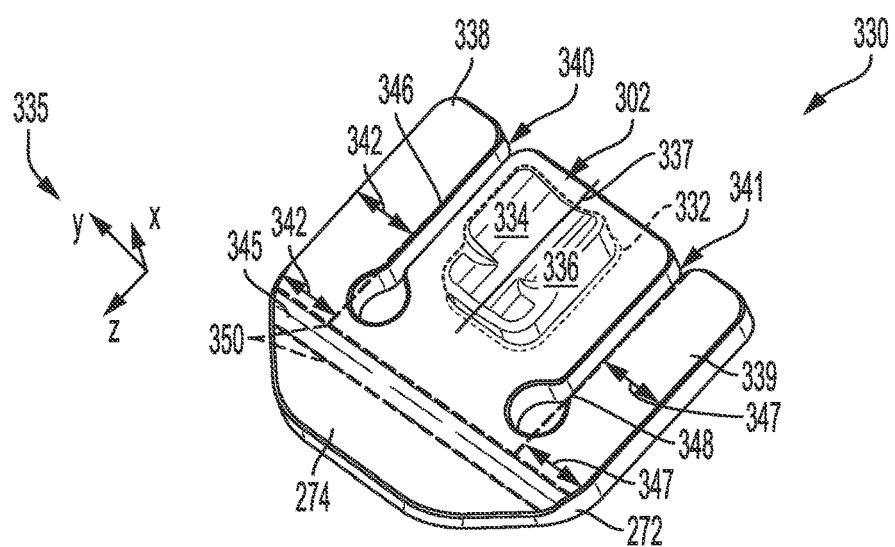
FIG. 3B illustrates an isolated three-dimensional (3D) view of a cup plate of the cathode cup assembly of FIG. 3A including a cup section, one or more arms, and a joint that can include internal porous section(s)

Turning now to FIG. 3A, example illustration 300 shows cathode cup assembly 62 from the viewpoint of observer 293 as discussed above at FIG. 2C. For reference, the x-axis, y-axis, and z-axis are depicted at coordinate system 301. Depicted is cup plate 272, of which first coupling region 274 is a part thereof. Furthermore, cup section 302, also referred to herein as focusing cup 302, which is a part of cup plate 272, is viewable via the viewpoint shown at FIG. 3A. It may be understood that cup section 302 sits behind the emitter (not shown), when viewed via the viewpoint indicated at FIG. 3A. Cup section 302 is defined generally by dashed line 303. Similar to that discussed at FIG. 2C, ceramic plate 275 is positioned between cup plate 272 and biasing electrodes 276. Also depicted is weld pad 361 (e.g., same as weld pad 277 at FIG. 2C), which is between biasing electrodes (e.g., biasing electrodes 276 at FIG. 2C) and ceramic plate 275. FIG. 3B depicts an isolated view 330 of cup plate 272, to better illustrate cup section 302. Cup section 302 protrudes from cup plate 272 along the longitudinal, or x-axis, as shown by coordinate system 335. Furthermore, while not explicitly illustrated, it may be understood that cup section 302 protrudes away from extenders (e.g., first extender region 201 and second extender region 202 of lower extender 231 at FIG. 2A) along the x-axis. Cup section 302 may be symmetric, for example first cup section 334 and second cup section 336 may be mirror images of one another when cup section 302 is divided by line 337.

As discussed above, the cup section 302 sits behind the emitter (not shown), which is a heat source when current is flowing through the emitter coils. Accordingly, there may be substantial heat transfer from the emitter to cup section 302. The ceramic plate (e.g., ceramic plate 275 at FIG. 3A) is used as an insulator for the cathode cup assembly, as discussed with regard to FIG. 2C above, however, as mentioned, the ceramic plate may no longer function as an effective insulator under circumstances where the threshold temperature of the ceramic plate is exceeded. Accordingly, it is herein recognized that it may be beneficial to make the internal portion of cup section 302 porous, via the use of additive manufacturing technology as discussed above with regard to FIG. 2A. The use of additive manufacturing technology may enable external surfaces associated with cup section 302 to be uniform and electropolished if need be. By making the internal portion of cup section 302 porous, heat transfer to the ceramic plate (e.g., ceramic plate 275 at FIG. 3A) may be reduced. This may in turn improve the insulating function of the ceramic plate by maintaining the temperature of the ceramic plate below the threshold temperature, to avoid the reduction in the insulating capacity of the ceramic plate which may occur if the threshold temperature is exceeded.

As one example, an entirety of cup section 302 may be internally porous. The entirety of cup section 302 is depicted by dashed line 332. However, in other examples just a portion or portions of cup section 302 may be internally porous. For example, just first cup section 334 may be internally porous, while second cup section 336 may be solid. Alternatively, just second cup section 336 may be internally porous, while first cup section 334 may be solid. In other examples, first cup section 334 may have a first total porous area (e.g., area of all pores included in first cup section 334), and second cup section 336 may have a second total porous area. The first total porous area may be greater than the second total porous area in some examples, whereas the second total porous area may be greater than the first total porous area in other examples.

Cup plate 272 includes a first arm 338 and a second arm 339. First arm 338 may be defined by a first gap 340 in cup plate 272 that separates first arm 338 from cup section 302, and second arm 339 may be defined by a second gap 341 in cup plate 272 that separates second arm 339 from cup section 302. An entirety of first arm 338 and/or second arm 339 may include an internal porous region, as discussed herein. Alternatively, just a portion of first arm 338 and/or second arm 339 may include an internal porous region. The entirety of first arm 338 may be defined as a first width 342 that extends from an outer edge of first arm 338 to first gap 340, and a length that extends along the z-axis to joint 345 associated with coupling region 274, illustratively depicted by dashed line 346. The entirety of second arm 339 may be defined as a second width 347 that extends from an outer edge of second arm 339 to second gap 341, and a length that extends along the z-axis to joint 345 associated with coupling region 274, illustratively depicted by dashed line 348.

In some examples, it may be desirable to have joint 345 include an internal porous region. For example, an entirety of joint 345, depicted as being between dashed lines 350, may be comprised of an internal porous region as discussed herein. In other examples, just a portion of joint region 345 may be comprised of an internal porous region.

Figure 3C:
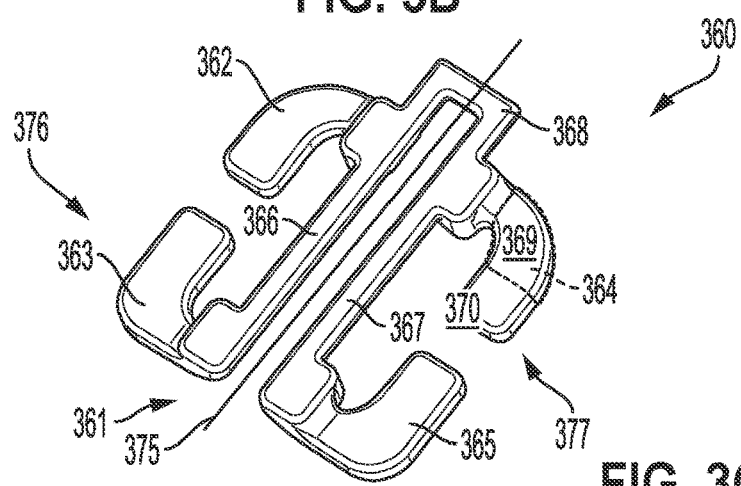
FIG. 3C illustrates an isolated three-dimensional (3D) view of an emitter weld pad of the cathode cup assembly of FIG. 3A, including legs, each of which can include an internal porous section.

Turning to FIG. 3C, depicted is an example illustration 360, showing an isolated view of an emitter weld pad 361 (e.g., same as emitter weld pad 277 at FIG. 2C). Emitter weld pad 361 may have a first leg 362, and a second leg 363. Emitter weld pad 361 may further include a third leg 364 and a fourth leg 365. Each of first leg 362 and second leg 363 may extend from first support member 366. Similarly, each of third leg 364 and fourth leg 365 may extend from second support member 367. First support member 366 may be joined to second support member 367 via coupling member 368. Using third leg 364 as an example, the legs may include an elbow region 369, and a square or rectangular region 370. The square or rectangular region 370 may include a receiving orifice 371 that may be used as a means to secure the weld pad within the cathode cup assembly (e.g., cathode cup assembly 62 at FIG. 3A). Furthermore, emitter weld pad 361 may be symmetric when divided along axis 375. In other words, a first portion 376 of emitter weld pad 361 that includes first leg 362 and second leg 363 may be a mirror image of a second portion 377 of emitter weld pad 361 that includes third leg 364 and fourth leg 365. It is herein recognized that it may be beneficial in terms of thermal management of the cathode cup assembly to have at least a portion of at least one of the legs of the weld pad include an internal porous region, similar to that discussed above at FIG. 2A, and further elaborated at FIG. 3B. It may be understood that any number of the legs may include the internal porous region. For example, just the first leg may include the internal porous region, just the second leg may include the internal porous region, just the third leg may include the internal porous region, or just the fourth leg may include the internal porous region. In another example, just the legs corresponding to the first portion 376 of emitter weld pad 360 may include porous internal regions, while the legs corresponding to the second portion 377 may be solid. In yet another example, just the legs corresponding to the second portion 377 of emitter weld pad 360 may include porous internal regions, while the legs corresponding to the first portion 376 may be solid.

In some examples, the elbow region 369 of one or more legs may include the porous internal region, while the square or rectangular region 370 of the one or more legs may be solid. Alternatively, the square or rectangular region 370 of one or more legs may include the porous internal region, while the elbow region 369 of the one or more legs may be solid. Still further, in some examples an entirety of one or more legs (e.g., both the elbow region and the square or rectangular region) of the emitter weld pad may include the porous internal region. Other options are within the scope of this disclosure. As examples, one or more legs may include the internal porous region along their entirety, while one or more other legs may include the internal porous region along just a portion (e.g., just the elbow region, or just the square or rectangular region). Furthermore, it may be understood that the elbow region and/or the square or rectangular region dimensions may be adjusted, or in other words, may not be limited to the general dimensions shown at FIG. 3C. For example, the elbow region may be of a smaller dimension and the square or rectangular region may be of a larger dimension, and vice versa, without departing from the scope of this disclosure. It may be understood that inclusion of porous internal regions in the one or more legs of the emitter weld pad may reduce thermal conductivity, which may reduce an amount of heat transfer to the ceramics. There may be several advantages to this. First, the ceramics may have temperature limits, and thus inclusion of the porous regions may help to maintain the ceramics below a desired temperature. Second, it may be desirable to get the emitter to a desired emitter temperature with a minimal amount of drive current. Reducing heat loss to other parts of the cathode assembly by including the internal porous regions in the legs may enable a reduced electrical component sizing. Finally, as the weld pad may be close to parts of the cathode at different potentials, having a smooth outer surface may increase an ability to withstand the voltage potential without causing arcs, which may otherwise lead to cathode degradation.

It may be understood that there may be different ways in which the internal porous regions may be constructed. For example, returning to FIG. 2A, inset 220 depicts the internal passageways (e.g., internal passageways 222 at FIG. 2A) as substantially rectangular. Similarly, at FIG. 4A, an example section 400 of a leg of the emitter weld pad, the cathode cup section and/or other aspects of the cup plate, and/or the lower extender includes the internal porous region is depicted as comprised of internal passageways 401 that are substantially rectangular. However, in other examples the internal passageways 401 may be substantially square in nature, without departing from the scope of this disclosure, or may include some combination of square and rectangular internal passageways. It may be understood that dimensions and density of the internal passageways may be selected based on desired thermal management strategy with regard to the cathode assembly (e.g., cathode assembly 44 at FIG. 1B) and/or high voltage connector (e.g., high voltage connector 212 at FIG. 2A).

A face 402 of example section 400 is shown as open for illustrative purposes, however it may be understood that the face may not be open when the section is manufactured to include the internal passageways. In other words, an external solid layer or skin 403 may surround the internal passageways. The external solid layer 403 may be of a same material as the solid lattice structure 404 that defines the internal passageways. However, in other examples, it may be possible to have the external solid layer 403 be of a different material than the material that makes up the solid lattice structure that defines the internal passageways. For example, the solid lattice structure that defines the internal passageways may be of a first material or composition, and may transition to a second material in some examples for creating the external solid layer 403.

Figures 4A, 4C, 4D:
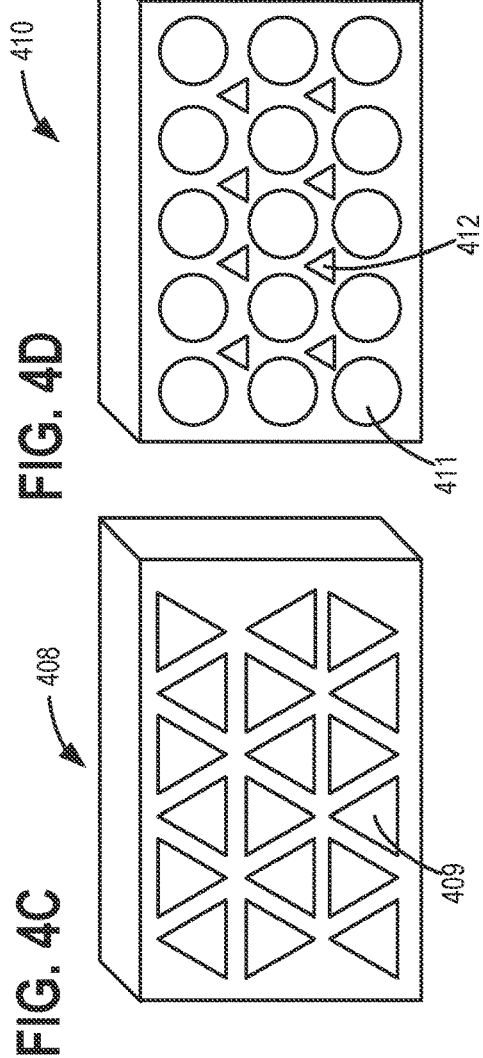
FIGS. 4A-4D illustrate examples of the internal porous sections of the present disclosure.
Figure 4B:
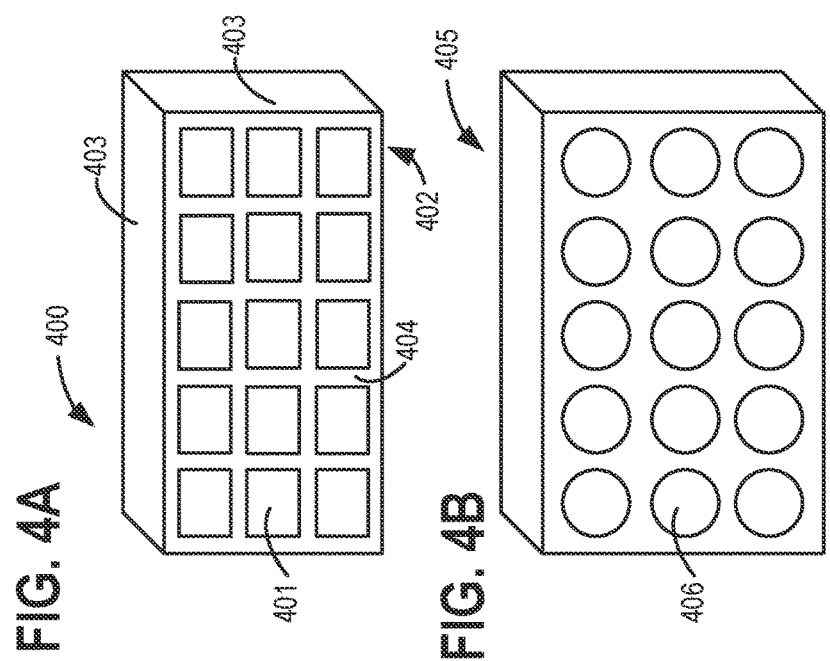
Figure 4E:
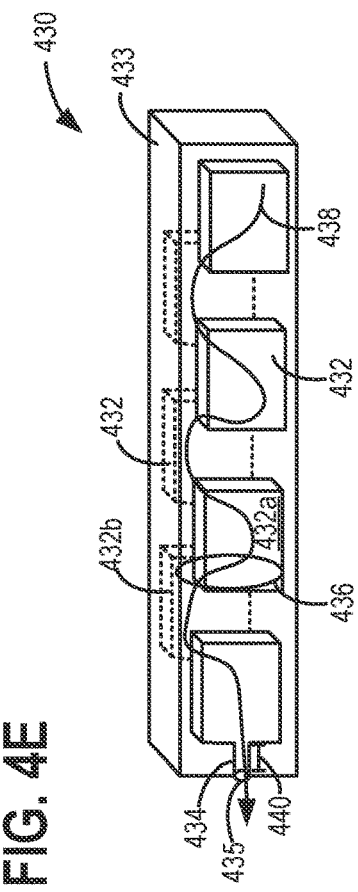
FIG. 4E illustrates how the internal porous sections of the present disclosure can be formed.

The remainder of each of FIGS. 4B-4D depict example variations as to the shape of internal passageways that can make up the internal porous sections of the present disclosure. It may be understood that, for each of FIGS. 4B-4D, the face (similar to face 402 at FIG. 4A) is open for illustrative purposes. Furthermore, in similar fashion to FIG. 4A, the internal passageways discussed with regard to FIGS. 4B-4D may be understood to be defined by a solid lattice structure, and the skin or external layer may be understood to be solid, and composed of the same material or a different material that makes up the solid lattice structure. Furthermore, for each of FIGS. 4B-4D, it may be understood that dimensions and density of the internal passageways may be selected based on desired thermal management strategy with regard to the cathode assembly (e.g., cathode assembly 44 at FIG. 1B) and/or high voltage connector (e.g., high voltage connector 212 at FIG. 2A). Thus, for brevity, such description will not be exhaustively reiterated for each of FIGS. 4B-4D.

Turning to FIG. 4B, example section 405 of a leg of the emitter weld pad, the cathode cup section or other aspects of the cup plate and/or the extenders that includes the internal porous region is depicted as comprised of internal passageways 406 that are substantially circular in nature. However, it may be understood that in other examples, the internal passageways may be substantially oval, for example, or may be some combination of circular and oval.

Turning to FIG. 4C, example section 408 of a leg of the emitter weld pad, the cathode cup section or other aspects of the cathode cup plate and/or the extender(s) that includes the internal porous region is depicted as comprised of internal passageways 409 that are substantially triangular in nature. The orientation of triangular-shaped internal passageways 408 may alternate as shown, which may increase a density by which internal passageways 408 may be included within example section 408. However, such a depiction is meant to be illustrative, and other manners of incorporating triangular internal passageways into section 408 are within the scope of this disclosure.

FIG. 4D depicts example section 410 of a leg of the emitter weld pad, the cathode cup section or other aspects of the cup plate and/or the extender(s) that includes the internal porous section as comprised of internal passageways 411 and 412. In this example, internal passageways 411 are substantially circular in nature, and internal passageways 412 are substantially triangular in nature. Thus, it may be understood that example section 410 depicts a situation where a combination of shapes are used for the internal passageways, which may be used in some examples to fine-tune thermal management properties of the particular internal porous section.

It may be understood that the above examples are meant to be illustrative, and the description is not meant to be exhaustive. For example, combinations of three or more different shapes may be used in some examples. Shapes not depicted at FIGS. 4A-4D may in other examples be used. In other words, it may be understood that, as discussed above, dimensions, shapes, and density of internal passageways may be selected based on the desired thermal management application with regard to the cathode assembly and high voltage connector.

As discussed above, the generation of X-rays may take place in a vacuum (e.g., negative pressure with respect to atmospheric pressure). It is herein recognized that it may be desirable to design the internal porous regions of, for example, the cathode cup section (e.g., cathode cup section 302 at FIG. 3B), lower extender extender(s) (e.g., lower extender 231 at FIG. 2D), and leg(s) of the emitter weld pad (e.g., emitter weld pad 361 at FIG. 3C) to include a means for evacuating each and every internal passageway (e.g., internal passageway 222 at FIG. 2A). In other words, in operation of the X-ray tube (e.g., X-ray tube 40 at FIG. 1), it may be desirable to have an entirety of the internal passageways for each section that includes the porous internal region be at a same vacuum level as regions surrounding the cathode and target (e.g., the region encased by enclosure 46 at FIG. 1). As discussed, an advantage of using additive manufacturing technology to manufacture parts of the X-ray tube, in particular parts that include internal porous regions, is that the internal regions may be made porous while the external regions may be uniform and non-porous, and may even be electropolished. Thus, it is herein recognized that in order to realize the benefits of having an internal region of the cathode cup section, lower extender and/or emitter weld pad be porous with a uniform external region or skin for thermal management purposes, it may be desirable to include in the design strategy a means for evacuating the corresponding internal passageways.

Turning to FIG. 4E, depicted is an example region 430 of, as an example, the cathode cup section, that includes internal passageways 432. Similar to that discussed above at FIGS. 4A-4D, an external surface 433 may be understood to be solid. However, in order to enable evacuation of an entirety of internal passageways 432, a few conditions may have to be met. First, at least one internal passageway 432 may have to be fluidically coupled with surrounding ambient air that is encased by an insert (e.g., enclosure 46 at FIG. 1), and which as discussed is evacuated for operating the X-ray tube. Second, for a particular region that includes internal passageways, an evacuation pathway may have to be established that connects the internal passageways, thereby enabling an entirety of the internal passageways to be evacuated.

Accordingly, FIG. 4E depicts evacuation channel 434. Evacuation channel 434 fluidically couples internal passageways 432 to air that surrounds at least portions of the cathode assembly and the anode assembly, via evacuation vent 435. Furthermore, internal passageways 432 at least partially overlap each another, for example at overlap regions 436 where, for example, a first internal passageway 432a fluidically couples to a second internal passageway 432b. The partial overlap may thus impart an evacuation pathway 438 to the region 430 that includes internal passageways 432.

It may be understood that a length 440 of evacuation channel 434 may be determined based on the desired thermal management strategy. In other words, length 440 of the evacuation channel 434 that couples an internal passageway to air may be adjustable. While not explicitly illustrated, a width or diameter of the evacuation channel, and a shape of the evacuation channel, may too be adjustable. For example, it may be desirable in some examples to have a longer evacuation channel, such that the evacuation vent is positioned in a particular desired location with respect to the desired thermal management strategy. Specifically, the evacuation vent may be positioned in a benign area in terms of parameters including but not limited to stress and voltage field intensity. In order to achieve the positioning of the evacuation vent in such an area, it may be understood that the evacuation channel may in some examples be a straight channel, however in other examples may be a curved or meandering channel. A shape (e.g., cylindrical, square, rectangular, triangular, etc.), width, length, etc., of the evacuation channel may be selected taking into account, structural and fatigue aspects of the region that the evacuation channel passes through.

Furthermore, in some examples, more than one evacuation channel may be used for a particular region that includes internal passageways. For example, rather than a single evacuation channel, a plurality (e.g., two or more) of evacuation channels may be used for a particular region. In some examples, the plurality of evacuation channels may be fluidically coupled via a common evacuation pathway, whereas in other examples each evacuation channel may separately evacuate a portion of a particular region that includes internal passageways, such that overall, an entirety of the internal passageways corresponding to a particular region is readily evacuated.

As discussed above, particular regions of, for example the cathode cup section (e.g., cathode cup section 302 at FIG. 3B), emitter weld pad (e.g., emitter weld pad 361 at FIG. 3C), and lower extender (e.g., lower extender 231 at FIG. 2D) may include the internal porous regions, whereas other, adjacent regions may be solid. This may enable the tailored incorporation of thermal management aspects to portions of the cathode assembly (e.g., cathode assembly 44 at FIG. 1). It is thus herein recognized that there may be different ways in which to transition from an internal porous region to an internal solid region. The manner in which the transition is designed into the particular region may be selected based on thermal management strategy considerations, stress considerations, etc.

FIG. 5 depicts a few general examples for how a region that includes internal passageways may be transitioned to a solid region, depending on the application. Beginning with FIG. 5A, illustration 500 shows a particular region of, for example, the cathode cup section, emitter weld pad, or extender(s) that include internal passageways 505. The particular region includes solid section 506 that forms the lattice structure defining internal passageways 505. There are four different transition regions depicted. First transition region 507a and second transition region 507b represent abrupt transitions, where the internal passageways 505 immediately transition to solid 506. Alternatively, transition regions 508a and 508b represent more gradual transitions to solid 506. Of course, it may be understood that no matter how gradual the transition, at some point and along a border between a region containing internal passageways and the solid section, there may be an abrupt transition. However, gradual transitions from an area of increased internal passageway density, for example as defined by region 510 (formed by the border defined by transition regions 507a, 507b, 508a and 508b) at FIG. 5, to an area of lesser internal passageway density, for example as defined by regions 512 at FIG. 5, may be understood to in some examples be useful in terms of thermal management strategy and stress/fatigue considerations. For example, a gradual transition from an area of greater internal passageway density to an area of lesser internal passageway density may enable a more gradual transition from an area of increased thermal retention to lesser thermal retention. Strategic use of such transition regions may thus enable at least some tailoring of heat flow given a desired thermal management strategy. For example, transition regions may be used to direct a flow of heat, or radiative heat transfer, away from a particular region (e.g., a more heat-sensitive region) to another region (e.g., a lesser heat-sensitive region) in some examples.

As discussed above, internal passageways in particular regions/components of a cathode assembly (e.g., cathode assembly 44 at FIG. 1B) may be included/generated by use of additive manufacturing technology. However, it may be understood that not just the portions for which the internal passageways are included may be constructed via the use of additive manufacturing technology, but instead entire components may be generated via the use of additive manufacturing technology.

For example, in a case where additive manufacturing technology is not used to manufacture a particular component or set of components, the manufacturing process may include forming, fixing or joining different parts (e.g., parts made up of different materials) via a brazing process (e.g., soldering together parts with an alloy of copper and zinc at high temperature), and which may further include a process of electronic discharge machining (EDM) (e.g., a process of removing metal by producing a rapid series of repetitive electrical discharges). However, the brazing and EDM process may each be time-consuming and such processes may be avoided or at least substantially reduced via the use of additive manufacturing technology.

Turning now to FIG. 6, depicted is an example method 600 for using additive manufacturing technology (e.g., 3D printing) to produce a component or components of a cathode assembly (e.g., cathode assembly 44 at FIG. 1), including but not limited to lower extender (e.g., lower extender 231 at FIG. 2D), and various components of a cathode cup assembly (e.g., cathode cup assembly 62 at FIG. 3B) such as a cathode cup section (e.g., cathode cup section 302 at FIG. 3B) and/or one or more legs or leg elements of an emitter weld pad (e.g., emitter weld pad 361 at FIG. 3C).

At 602, the method includes obtaining or generating a 3D model of the particular component or components. In some examples, the 3D model may correspond to a desired region of the particular component or components. The 3D model may be a computer aided design (CAD) file, additive manufacturing file (AMF), or other 3D modeling file. The 3D model of the particular component or components may be generated on a printer-interfacing computing device. In some examples, the 3D model may be generated entirely from operator instructions via the CAD or other program. In other embodiments, the 3D model may be generated at least in part from information received from a 3D scanner (e.g., a laser scanner) that may image a physical model of the component or components. The 3D model may define the dimensions of the component or components, exterior and interior structures of the component or components, and material properties of the component or components, thereby fully representing, in a digital format, the final form of the component or components that will be produced. As appreciated by FIGS. 2A-5 (described in detail above), for example, the component or components may include voids (e.g., empty space) and thus the 3D model of the component or components may include solid support structures, fill material, or other features as discussed above that allow for printing over the voids so that the voids are accurately reproduced.

At 610, the method includes generating a plurality of 2D slices of the 3D model of the component or components. The slices may be generated on the printer-interfacing computing device and then the plurality of slices are sent to the printing device as an STL file, or the 3D model may be sent to the printing device, and the printing device may slice the 3D model into the plurality of slices to generate an STL file. In doing so, the 3D model may be sliced into hundreds or thousands of horizontal layers of a suitable thickness, such as a thickness in a range from 0.1 mm to 3 mm. The total number of layers or slices may be based on a thickness of the component or components, a material or materials used for the printing, and/or user selection. At 615, the method includes printing, with the printing device, the first slice on a build plate or other suitable base material. When the printing device prints from the STL file, the printing device creates or prints the component or components layer-by-layer starting from a first layer build plate. Accordingly, at 620, the method includes sequentially printing each additional slice of the 3D model. For example, the printing device may read every slice (or 2D image) from the 3D model and proceed to create the 3D case by laying down (or printing) successive layers of material on an upper, planar surface of the component or components until the entire component or components is/are created. Each of these layers can be seen as a thinly sliced horizontal cross section of the eventually completed or printed 3D component or components.

The printing device may be a suitable device configured to print metal and/or other materials, such as ceramic material. The printing device may utilize selective laser melting (SLM) technology, direct metal laser sintering (DMLS) technology, or other suitable metal printing technology. In some examples, the printing device may be configured to print multiple materials (e.g., the material for the emitter weld pad, material for the ceramic plate, material for the cup section and other sections of the cup plate, etc.) and thus may include more than one print head.

During printing, the print head(s) may be moved, in both horizontal and vertical directions, to complete or print each layer of the 3D model, by a controlled mechanism that is operated by control software running on the printing device, e.g., a computer-aided manufacturing (CAM) software package adapted for use with the printing device. The build plate may be typically stationary with its upper planar surface parallel to a horizontal plane, although in some examples the build plate may be moved up and down vertically (i.e., in the z-direction). The printed material may solidify to form a layer (and to seal together layers of the 3D component or components), and the print head or build plate is then moved vertically prior to starting the printing of the next layer. This process is repeated until all layers of the 3D component or components have been printed.

At 625, the method includes drying and/or curing the component or components. For example, the printing process may include one or more drying and/or curing stages, which may include drying and/or curing each layer after the respective layer is printed and/or drying and/or curing the printed component or components after all layers are printed. The printed material may be cured by exposure to heat or UV radiation and allowed to harden (e.g., fully or partially). After drying/curing, any fill material used may be removed. For example, if a fill material is printed in the voids, the case may be placed into water, acid, or other solvent to dissolve the fill material. In another example, if support structures are printed in the voids (e.g., scaffolding-like structures or perforated structures), the support structures may be removed manually and/or with a tool. In still other examples, the voids may be included via a printing strategy that does not rely on fill material or support structures. In some examples, the entire component or components may be printed as a single unit, while in other examples, the 3D model of the component or components may include multiple 3D models, each of a different section of an overall part of the X-ray tube.

The method 600 provides an example for manufacturing cathode assembly components of the present disclosure using additive manufacturing technology, such as 3D printing. In an example, the component(s) described herein may be manufactured according to a computer readable medium including computer readable instructions which, when executed on a 3D printer or associated computing device, cause the printer to print the component or components. It is to be understood that the example additive manufacturing process described in FIG. 6 is just one example of manufacturing the component(s) of the present disclosure, and other manufacturing processes may be used in addition to or as an alternative to the method 600. For example, all or a portion of the component(s) of the present disclosure may be manufacturing using a mold. The mold may be generated by first 3D printing a model of the component(s) in a suitable material that may be solid at room temperature but changes to liquid at a relatively low temperature that is greater than room temperature, such as wax. A plaster mold may be formed over the wax model, and after the plaster dries, the wax may be melted and drained from the mold. The mold may then be filled with molten metal. Once the metal cools, the plaster may be removed to generate the component(s). As another example, the component(s) may be manufactured using subtractive manufacturing technology. As still another example, the case may be formed by stack lamination, in which different layers of the case are formed independently by a process such as photolithography, and the layers are stacked and laminated to fuse the layers together. It is to be understood that any combination of 3D manufacturing techniques may be combined to produce the component(s) of the present disclosure.

As discussed above, the 3D printing process may utilize one or more materials for building the structure of the component(s). For example, different regions of the component(s) may be manufactured using different materials. Some regions of the component(s) may be manufactured using material with higher elasticity/flexibility than other regions, higher porosity than other regions, higher density/strength than other regions, etc. In other examples, the entire component(s) may be printed using the same material. As described above, examples of materials used for manufacturing the case include metals, metal alloys, ceramics, etc.

Thus, via the use of additive manufacturing technology, internal porous sections may be incorporated into various aspects of a cathode assembly of an X-ray tube. The use of additive manufacturing technology may simply construction of the various aspects of the cathode assembly, in some examples. For example, the use of additive manufacturing technology may enable internal porous sections to be encased in a uniform external skin, which may be electropolished depending on the application. In a case where a plurality of individual components are otherwise combined, for example, via a brazing process, into a final functional aspect of the cathode assembly, the brazing process may be avoided, and the individual components may be combined into a single functional component or aspect of the cathode assembly.

A technical effect of including internal porous sections into a component or components of a cathode assembly is to improve thermal management of the cathode assembly during operation of the X-ray tube. For example, strategic placement of the internal porous sections may enable a desired flow of heat from a heat source (e.g., emitter, target, etc.) to a heat sink (e.g., air, oil, etc.). As another example, heat flow to temperature sensitive material including insulators (e.g., ceramics, epoxies, etc.) may be controlled (e.g., reduced) to as to maintain the temperature sensitive material below desired threshold temperatures. In this way, a lifetime of the X-ray tube may be improved.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for producing a component of a cathode assembly of an X-ray tube, comprising:
   obtaining, via a processor, a file of a three-dimensional (3D) model of the component including an internal porous section or sections of the component;
   obtaining, via the processor, a plurality of slices including a first slice using the file of the three-dimensional (3D) model of the component;
   printing, via a printing device, the first slice of the three-dimensional (3D) model onto a base build plate;
   sequentially printing, via the printing device, the plurality of slices on top of the first slice; and
   drying and/or curing the component of the cathode assembly.

2. The method of claim 1, wherein obtaining the three-dimensional (3D) model further comprises including an evacuation pathway as part of the internal porous section or sections to enable evacuation of an entirety of the internal porous section or sections associated with the component during operational use of the X-ray tube.

3. The method of claim 1, wherein sequentially printing the plurality of slices further comprises using one or more different materials for producing the component.

4. The method of claim 1, wherein obtaining the three-dimensional (3D) model of the component further comprises selecting an area or areas of the component to include the internal porous section or sections based on a desired flow of heat within the component during operational use of the X-ray tube.

* * * * *